W. A. WILLIAMS.
COMBINED SOIL PULVERIZER AND CULTIVATOR.
APPLICATION FILED AUG. 26, 1911.
1,023,774.
Patented Apr. 16, 1912.
3 SHEETS—SHEET 1.
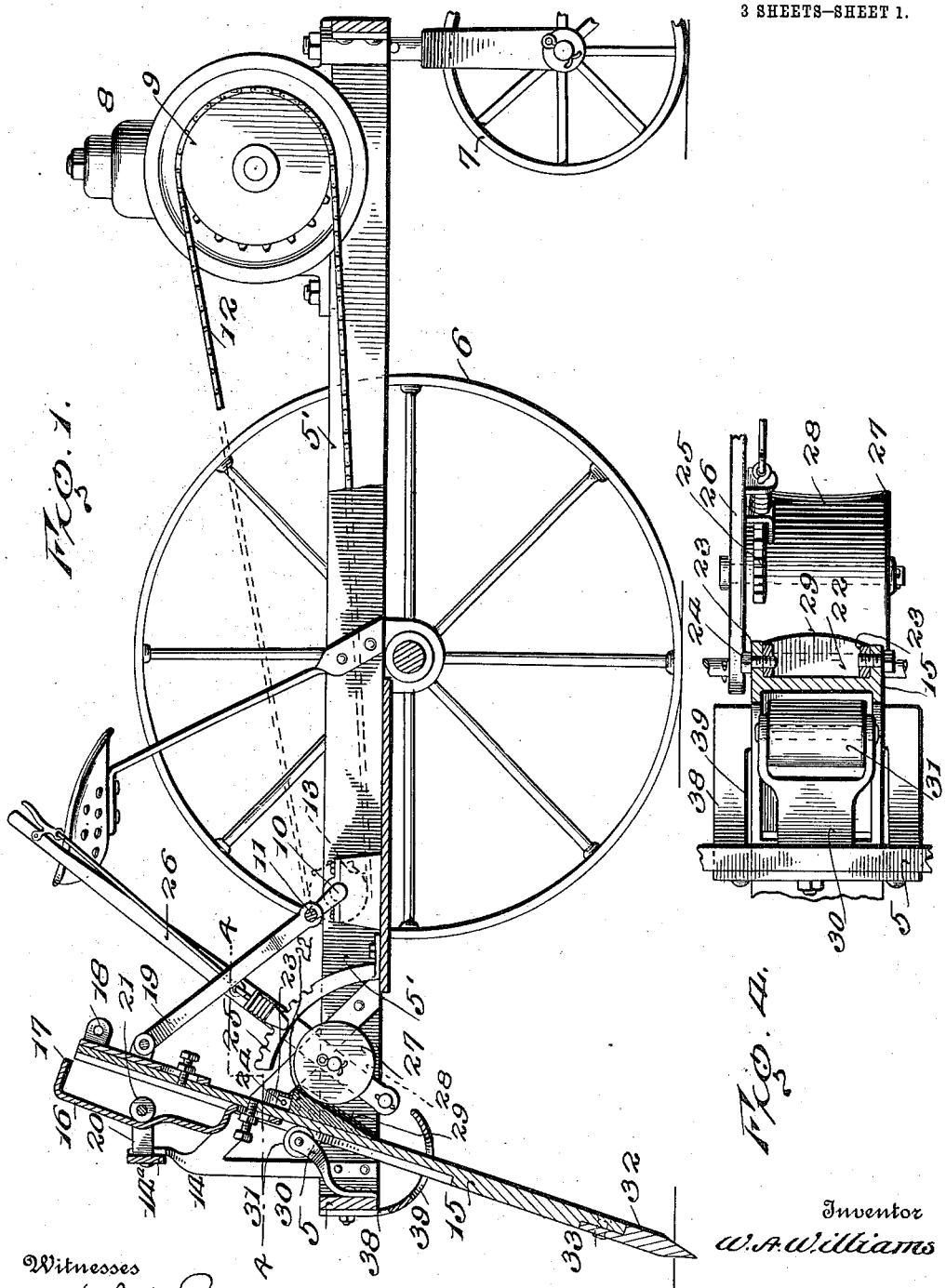

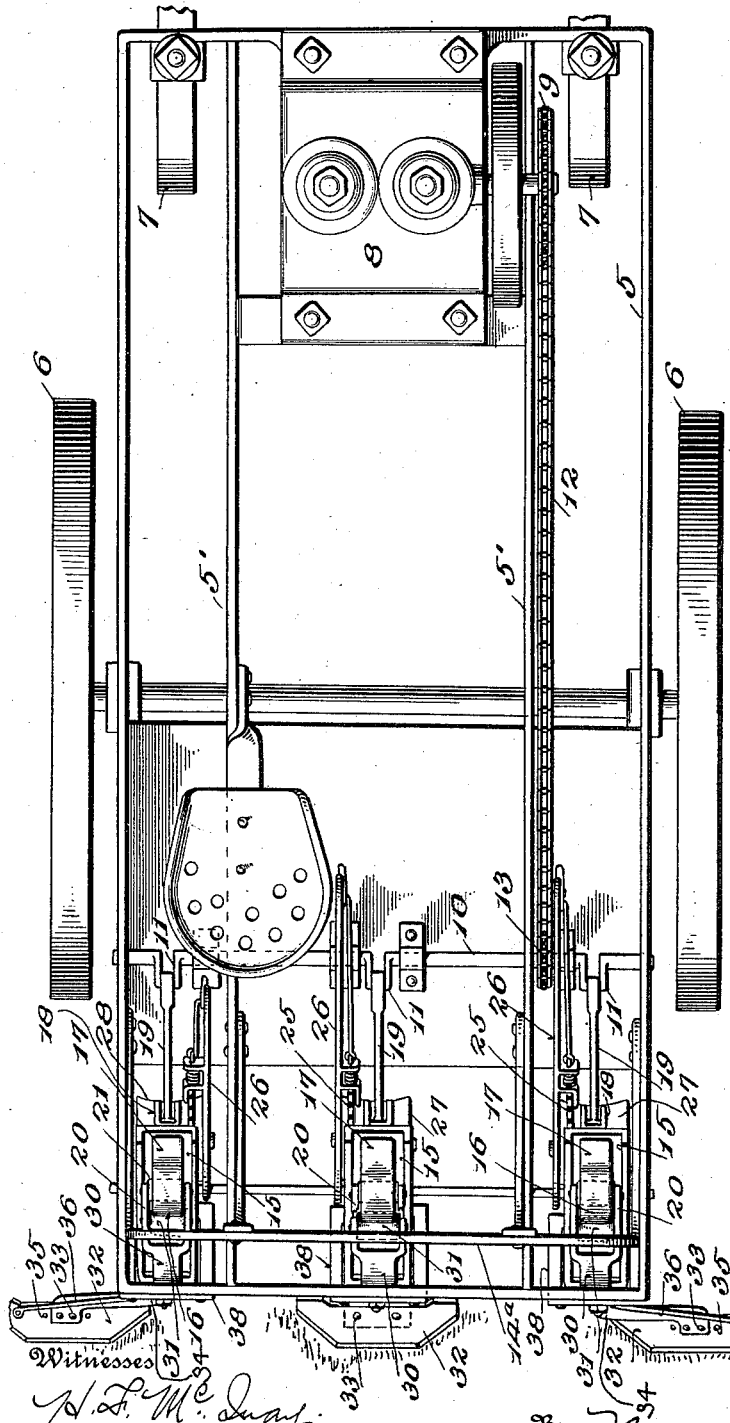

W. A. WILLIAMS.
COMBINED SOIL PULVERIZER AND CULTIVATOR.
APPLICATION FILED AUG. 26, 1911.
1,023,774.
Patented Apr. 16, 1912.
3 SHEETS—SHEET 3.
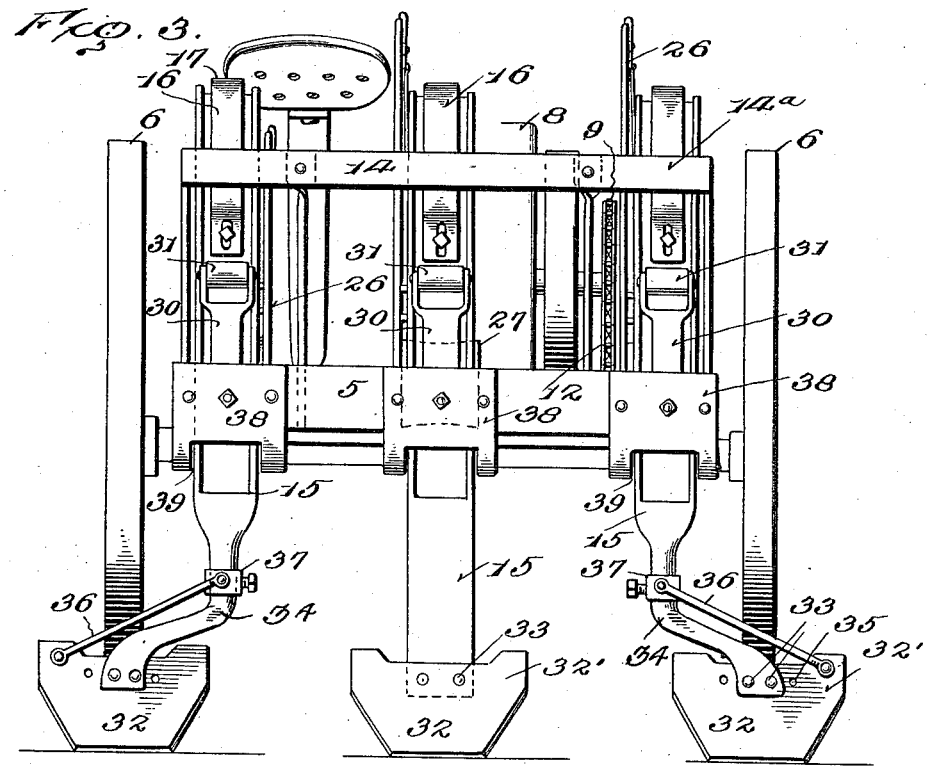
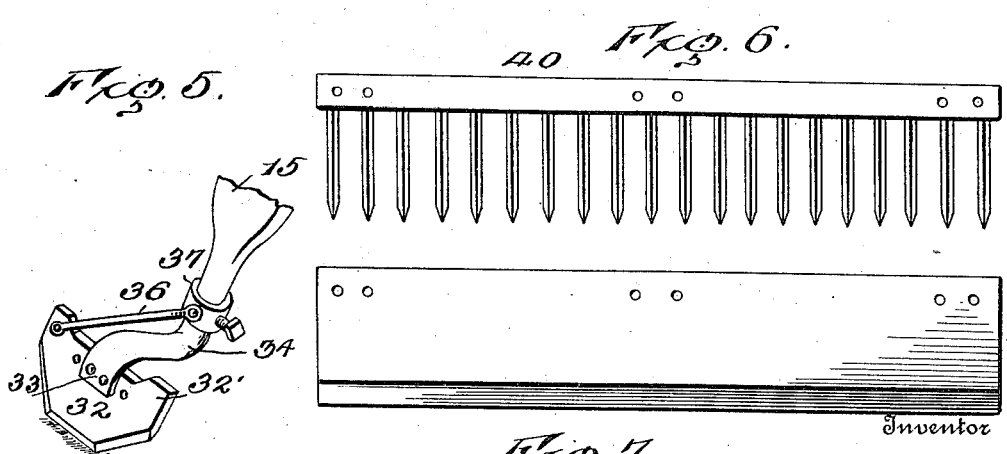
Witnesses
H. F. McDuay
A. B. Norton
Inventor
W. A. Williams
By Watson E. Coleman
Attorney

UNITED STATES PATENT OFFICE.

WILLIAM A. WILLIAMS, OF NEWPORT, ARKANSAS.

COMBINED SOIL-PULVERIZER AND CULTIVATOR.

1,023,774. Specification of Letters Patent. Patented Apr. 16, 1912.

Application filed August 26, 1911. Serial No. 646,126.

*To all whom it may concern:*

Be it known that I, WILLIAM A. WILLIAMS, a citizen of the United States, residing at Newport, in the county of Jackson and State of Arkansas, have invented certain new and useful Improvements in Combined Soil-Pulverizers and Cultivators, of which the following is a specification, reference being had to the accompanying drawings.

This invention relates to certain improvements in combined land pulverizers and cultivators, the present invention embodying certain features of construction disclosed in my prior application for patent filed June 24th, Serial No. 635,115, the present invention having for its primary object to materially simplify and improve the construction as well as to increase the utility of my original invention.

Another object of the invention resides in the provision of a plurality of vertically reciprocable earth engaging blades, and means to effect a progressive rearward movement of the blades in their vertical movement in one direction and to regulate the extent of such rearward movement.

A further object of the invention is to provide novel means for guiding the blades in their downward movement and preventing any rearward movement thereof when the means for effecting such rearward movement is inoperative.

Still another object of the invention is to provide means whereby the earth engaging blades may be easily and quickly adjusted in accordance with the width of the plant rows and securely braced so as to prevent injury thereto when they engage the ground.

With the above and other objects in view, the invention consists of the novel features of construction, combination and arrangement of parts hereinafter fully described and claimed, and illustrated in the accompanying drawings. in which—

Figure 1 is a longitudinal section of a soil pulverizer and cultivator embodying my improvements; Fig. 2 is a top plan view thereof; Fig. 3 is a rear elevation; Fig. 4 is a detail section taken on the line 4—4 of Fig. 1; Fig. 5 is a detail perspective view of one of the earth engaging blades or plows and bar by which it is carried; and Figs. 6 and 7 are detail views of implements which are adapted for use with the machine.

Referring in detail to the drawings 5 designates the frame which is mounted upon the rear wheels 6 and the front wheels 7, said latter wheels being of smaller diameter than the rear wheels and disposed wholly beneath the frame so that they may turn thereunder in guiding the machine. Any desired motive power may be used for drawing the machine and upon the front portion of the frame above the wheels 7 a gas or gasolene engine 8 is mounted. This engine may be of any approved construction and upon the shaft thereof a sprocket wheel 9 is mounted, said wheel being thrown into or out of operation by means of a suitable clutch, (not shown), mounted upon the engine shaft. Upon the frame 5 adjacent to its rear end a transverse shaft 10 is rotatably mounted in suitable bearings and has formed therein a plurality of cranks 11. The sprocket wheel 9 is connected by means of a drive chain 12 to a smaller sprocket 13 fixed upon the shaft 10 whereby said shaft is driven at a relatively high speed.

To the rear end of the wheel supported frame 5 a vertically disposed frame 14 is rigidly secured, said frame including the transverse bar 14' which extends across the upper end thereof. Adjacent to the longitudinally disposed frame bars 5' the vertically reciprocable blade carrying bars 15 are arranged, and upon the upper ends of these bars the spaced longitudinally disposed adjustable plates 16 are secured, the upper ends of said plates being outwardly bent or bowed as indicated at 17. Upon the opposite faces of the bar 15 a pair of ears 18 are longitudinally adjustable and to one of these ears, one end of the pitman 19 is pivotally connected, the other end of said pitman being connected to one of the cranks 11 of the shaft 10. A laterally extending arm 20 is secured to the transverse bar 14' of the vertically disposed frame 14 and has mounted upon its end a roller 21 which is disposed between the bar 15 and the plate 16 carried thereby. This roller is adapted to co-act with said plate in the manner and for the purpose which will more fully appear from the following description.

Upon the same side of the bar 15 as that on which the ears 18 are mounted, a block 22 is mounted and is adapted to be longitudinally adjusted between the guides 23, suitable set screws 24 being provided to engage flanges on said block and rigidly secure the same in its adjusted position. Upon the longitudinal bars 5' of the frame and adjacent to the vertically movable bars 15, the racks 25 are secured. Levers 26 are pivotally mounted at their lower ends upon the bars 5' and carry the usual spring pressed holding dogs for engagement with the teeth of the racks. Each of the levers 26 carries a rotatable disk or roller 27, the periphery of which is concaved or grooved as indicated at 28 to receive the rounded convex inclined edge 29 of the block 22. A spring plate 30 is fixed at one end to the rear transverse bar of the frame 5 and has a roller 31 journaled in its other end which is disposed in a longitudinal channel or groove in the rear face of the bar 15 whereby the free vertical movement of said bar is permitted while at the same time the spring plate 30 acts to retain the block 22 in engagement with the periphery of the disk 27.

To the lower end of each of the vertical bars 15 a ground engaging blade or shovel 32 is secured by means of the screws 33. As indicated at 34, the bars 15 which are disposed adjacent the sides of the machine are deflected or angularly disposed at their lower ends so that the blades 32 thereon are positioned directly behind and in line with the supporting wheels 6. These blades are also provided with additional bolt receiving openings 35 whereby the blades may be laterally adjusted upon the lower ends of the bars. The outer end portions of the ground engaging blades at the sides of the machine which engage the ground adjacent to the plant rows are firmly braced by means of the rods 36 which are pivotally connected to the diagonally and upwardly extending wings 32' formed on the ends of the blades. The upper ends of these brace rods are connected to the sleeves or collars 37 which are vertically adjustable upon the bars 15.

The operation of the machine as thus far described is substantially as follows. The engine is started whereupon the crank shaft 10 is rotated and vertical reciprocatory movement is imparted to the bars 15 through the medium of the pitmen 19. The roller or disk 27 being in contact with the inclined edge of the block 22, it will be obvious, that in the downward movement of the bars 15, said bars will be forced rearwardly against the tension of the spring plate 30. This downward and rearward movement of the earth engaging blades 32 which are carried by the bars 15 thoroughly breaks up the soil and also serves to assist in the forward movement of the machine which is of material importance when draft animals are employed as the motive power. The engagement of the roller 21 on the arm 20 with the plate 16 serves to restrain or retard the rearward movement of the lower ends of the bars 15 and overcomes the action of the spring plate 30 which would tend to force the upper end of the bar forwardly, the roller or disk 27 acting as a fulcrum. As the bars 15 are thus rapidly reciprocated, the blades 32 thoroughly disturb the earth at the roots of the plants so that all nourishment from the soil may be absorbed. It will be apparent that by simply adjusting the levers 26 on the racks 25, the position of the disks 27 with relation to the blocks 22 may be varied so that there will be a greater or less extent of rearward movement of the ground engaging blades as may be desired.

When working in hard or packed soil, the full power or force resulting from the engagement of the blades with the ground, assists in the forward movement of the machine; the plates in their rearward movement exerting a forward pushing action upon the machine and thereby accelerating its movement. In order to provide a guide for the lower portion of said bars beneath the frame and also to obviate any liability of their rearward movement upon such occasions as above stated, I provide a bowed stirrup or guide plate, which is provided with an opening 39 through which the bar 15 is movably disposed. When the disk 27 is in its inoperative position, the engagement of the bars 15 with the forward end walls of the openings 39 in the guide plates 38 prevents any further forward movement thereof under the action of the spring plate 30, said spring plate serving to hold the movable bar 15 in such position and to steady the same in its downward stroke. It will thus be seen that there will be no rearward movement of the blade and that the full force or impact thereof with the soil will be utilized in cutting through the hard surface and in facilitating the start of the machine.

In Figs. 6 and 7 of the drawings I have illustrated the implements which are adapted to be substituted for the blades 32. In Fig. 6 there is shown a hay fork 40 which is adapted to be secured upon the lower ends of the bars 15 and to scatter the hay in the movement of the machine over a field in the same manner as the common tedder. In order to properly dispose this fork with relation to the ground surface, the block 22 and the parts 16 and 18 are made adjustable upon the bars 15 as heretofore noted so that by simply adjusting the same, the length of stroke of the reciprocatory bars may be varied as desired and the hay fork properly disposed with relation to the ground.

In Fig. 7 there is shown a pulverizing blade of similar form to that disclosed in my prior application for patent. Either of these implements may be readily connected to the bars 15 by simply removing the bolts 33 whereby the ground engaging blades 32 may be detached.

From the foregoing it will be seen that I have devised a very simple and efficient machine which will thoroughly pulverize the soil between the plant rows and also cultivate the plants. The mechanism is durable in construction and also very positive and efficient in practical operation. The machine may also be constructed at comparatively small cost.

While I have shown and described the preferred arrangement of the various elements, it will be understood that the machine is susceptible of considerable modification in the form, and proportions thereof without departing from the essential feature or sacrificing any of the advantages of the invention.

Having thus described the invention what is claimed is:—

1. In a machine of the character described, a vertically reciprocable pulverizing blade and actuating means therefor, and a roller co-acting with said blade in its reciprocatory movement to impart a progressive bodily lateral movement thereto in its downward stroke.

2. The combination with a wheel supported frame, of a ground engaging blade vertically movable in said frame, a roller mounted in the frame, means carried by the blade co-acting with said roller to move the blade rearwardly in its downward movement, and means for adjusting said roller to regulate the extent of such rearward movement.

3. The combination with a wheel supported frame, of a blade vertically reciprocable in said frame, means for varying the stroke of the blade, an adjustable member mounted in the frame, means carried by the blade co-acting with said member to move the blade rearwardly in its downward stroke, the adjustment of said member regulating the extent of such rearward movement.

4. The combination with a wheel supported frame, of a vertically reciprocable earth engaging member mounted in said frame, a roller mounted in the frame, means carried by the blade co-acting with said roller to move the blade rearwardly in its downward stroke, means engaging the blade to yieldingly hold the roller engaging means in contact with the roller, and means for adjusting said roller to regulate the extent of rearward movement of the blade.

5. The combination with a wheel supported frame, of a vertically reciprocable bar mounted in said frame, an earth engaging member removably secured to the lower end of said bar, means for reciprocating the bar, a block carried by said bar, means mounted in the frame engaging said block to effect the progressive rearward movement of the bar in its downward stroke, means co-acting with said bar to restrain such rearward movement, and means for adjusting said block engaging means to vary the extent of rearward movement of the bar.

6. The combination with a wheel supported frame, of a vertically reciprocable bar arranged in said frame, means mounted in the frame and connected to said bar to reciprocate the same, an earth engaging member removably secured to the lower end of the bar, a block mounted on said bar having an inclined face, a roller arranged on the frame co-acting with the inclined face of the block to effect a progressive rearward movement of the bar in its downward stroke, and means for adjusting said roller to vary the extent of such rearward movement.

7. The combination with a wheel supported frame, of a plurality of vertically reciprocable bars arranged in said frame at its rear end, earth engaging members removably secured to the lower ends of said bars, operating means mounted in the frame to reciprocate the bars, means for adjustably connecting said operating means to the bars whereby the length of stroke of the bars may be varied, and a plurality of adjustable rollers mounted in the frame co-acting with said bars to impart a progressive rearward movement to the same in their downward stroke.

8. The combination with a wheel supported frame, of a plurality of vertically reciprocable bars arranged in said frame, rollers rotatably mounted in the frame and co-acting with said bars to impart a rearward movement thereto in the downward movement of the bars, means for bodily moving the rollers toward and from the bars to regulate the extent of such rearward movement and to move said rollers to an inoperative position, guide means for the bars arranged beneath the frame, means arranged on the frame and engaging said bars to direct the same in their downward movement and prevent rearward movement of the bars when the rollers are in their inoperative positions.

9. The combination with a wheel supported frame, of a plurality of vertically reciprocable bars mounted in said frame, means for reciprocating said bars, earth engaging members removably secured to the lower ends of the bars, blocks longitudinally adjustable upon said bars having inclined convex faces, members adjustable in the frame co-acting with the inclined faces of the blocks to move the bars rearwardly in their downward stroke, guide plates secured to the frame and having openings therein through which the bars are movably disposed, and means mounted in the frame engaging said bars to prevent their rearward movement when said adjustable members are moved to their inoperative positions.

10. The combination with a wheel supported frame, of a vertically reciprocable bar mounted in the frame, means for reciprocating said bar, an earth engaging member secured to the lower end of the bar, a block mounted upon said bar having an inclined convex face, and a roller mounted in the frame having a concave periphery to receive the convex face of said block.

11. The combination with a wheel supported frame, of a vertically reciprocable bar mounted in the frame, means for reciprocating said bar, an earth engaging member secured to the lower end of the bar, a block longitudinally adjustable upon one face of the bar, said block having an inclined convex face, a roller adjustable in the frame toward and from said block adapted to move the bar rearwardly in its downward stroke, said roller having a concave periphery to receive the convex face of the block, and means mounted in the frame yieldingly holding said block and roller in constant engagement.

In testimony whereof I hereunto affix my signature in the presence of two witnesses.

WILLIAM A. WILLIAMS.

Witnesses:
G. L. GRANT,
IRA J. MACK.

Copies of this patent may be obtained for five cents each, by addressing the "Commissioner of Patents, Washington, D. C."